United States Patent
Jin et al.

(10) Patent No.: US 9,614,425 B2
(45) Date of Patent: Apr. 4, 2017

(54) FAST-RESPONSE HORIZONTAL VIBRATION MICRO MOTOR

(71) Applicant: JINLONG MACHINERY & ELECTRONICS CO., LTD., Wenzhou, Zhejiang (CN)

(72) Inventors: Shaoping Jin, Wenzhou (CN); Shaobin Fang, Wenzhou (CN); Shi Chen, Wenzhou (CN); Ruize Zhang, Wenzhou (CN); Zhongping Li, Wenzhou (CN)

(73) Assignee: JINLONG MACHINERY & ELECTRONICS CO., LTD., Wenzhou (CN)

( * ) Notice: Subject to any disclaimer, the term of this patent is extended or adjusted under 35 U.S.C. 154(b) by 0 days.

(21) Appl. No.: 14/773,959

(22) PCT Filed: Nov. 21, 2014

(86) PCT No.: PCT/CN2014/091928
§ 371 (c)(1),
(2) Date: Jan. 11, 2016

(87) PCT Pub. No.: WO2015/106600
PCT Pub. Date: Jul. 23, 2015

(65) Prior Publication Data
US 2016/0254736 A1     Sep. 1, 2016

(30) Foreign Application Priority Data
Jan. 20, 2014  (CN) .......................... 2014 1 0024491

(51) Int. Cl.
*H02K 33/12* (2006.01)
*H02K 33/16* (2006.01)
(Continued)

(52) U.S. Cl.
CPC ............. *H02K 33/12* (2013.01); *H02K 33/16* (2013.01); *H02K 33/18* (2013.01); *H02K 1/34* (2013.01)

(58) Field of Classification Search
CPC .................... H02K 33/12; H02K 33/16–33/18
(Continued)

(56) References Cited

U.S. PATENT DOCUMENTS

| | | | | |
|---|---|---|---|---|
| 7,999,421 B2 * | 8/2011 | Kim | ....................... | H02K 33/18 310/15 |
| 8,269,379 B2 * | 9/2012 | Dong | ..................... | H02K 33/16 310/25 |

(Continued)

FOREIGN PATENT DOCUMENTS

| CN | 101841203 A | 9/2010 |
|---|---|---|
| CN | 102570764 A | 7/2012 |
| CN | 103401394 A | 11/2013 |

OTHER PUBLICATIONS

Mar. 4, 2015 International Search Report issued in International Patent Application No. PCT/CN2014/091928.
(Continued)

*Primary Examiner* — John K Kim
(74) *Attorney, Agent, or Firm* — Oliff PLC

(57) ABSTRACT

A fast-response horizontal vibration micro motor that includes a housing, a cover plate, a vibration assembly and coils. The cover plate is installed on the housing; the vibration assembly is suspended in the installation space; the coils are located at positions a certain distance above the vibration assembly; the vibration assembly can perform reciprocating vibration in a direction substantially parallel to the bottom surface of the housing, and also enables the two elastic supporting members located on the two opposite sidewalls to be correspondingly stretched and compressed during vibration; the vibration assembly includes a vibration
(Continued)

block, and the vibration block is provided with at least three installation through holes and permanent magnets installed in the installation through holes. The arrangement of the three permanent magnets increases the response speed of the motor, and the arrangement of the two serially-connected coils also increases the response speed of the motor.

11 Claims, 4 Drawing Sheets

(51) Int. Cl.
    *H02K 33/18*     (2006.01)
    *H02K 1/34*     (2006.01)

(58) Field of Classification Search
    USPC .............................................. 310/17, 25, 28
    See application file for complete search history.

(56) References Cited

U.S. PATENT DOCUMENTS

| | | | | |
|---|---|---|---|---|
| 8,410,642 B2 * | 4/2013 | Dong | ..................... | H02K 33/16 310/25 |
| 8,456,042 B2 * | 6/2013 | Dong | ..................... | H02K 33/16 310/15 |
| 8,878,401 B2 * | 11/2014 | Lee | ..................... | B06B 1/045 310/15 |
| 8,987,951 B2 * | 3/2015 | Park | ..................... | H02K 33/16 310/12.22 |
| 2010/0213773 A1 * | 8/2010 | Dong | ..................... | H02K 33/16 310/25 |
| 2010/0231060 A1 * | 9/2010 | Bang | ..................... | H02K 5/225 310/25 |
| 2011/0115311 A1 * | 5/2011 | Dong | ..................... | H02K 33/16 310/28 |
| 2011/0156500 A1 * | 6/2011 | Dong | ..................... | H02K 33/16 310/25 |
| 2012/0049660 A1 * | 3/2012 | Park | ..................... | B06B 1/045 310/25 |
| 2012/0104875 A1 | 5/2012 | Park | | |
| 2012/0112565 A1 | 5/2012 | Lee | | |
| 2012/0169148 A1 * | 7/2012 | Kim | ..................... | H02K 33/18 310/25 |

OTHER PUBLICATIONS

Mar. 9, 2015 Office Action issued in Chinese Patent Application No. 201410024491.3.
Jul. 23, 2015 Office Action issued in Chinese Patent Application No. 201410024491.3.
Dec. 4, 2015 Decision to Grant issued in Chinese Patent Application No. 201410024491.3.

* cited by examiner

FAST-RESPONSE HORIZONTAL VIBRATION MICRO MOTOR

TECHNICAL FIELD

The present invention relates to a fast-response horizontal vibration micro motor, which belongs to the technical field of linear vibration motor.

BACKGROUND OF THE INVENTION

Currently, the mobile consumer electronics in the market generally uses vibration motor as the feedback member of the system, such as caller ID of mobile phone, the vibration feedback of game machines and so on. The existing vibration motor mainly comprises a cylindrical core motor, a hollow cup motor and a linear motor. The cylindrical core motor and the hollow cup motor not only have a complex structure, a large thickness and a complicated manufacturing process, but also have loud noise and poor control accuracy. Nowadays, in order to meet the design requirements of the mobile consumer electronics, which require the products to be thinner and portable, the vibration motors are gradually developed with a tendency of being flattened and thinner. A linear vibration motor is a motor with the vibrator vibrating linearly and reciprocally along a vibration direction, which is widely used in consumer electronics, because of the stable vibration thereof.

The Chinese Patent CN102570764 discloses a linear vibration motor, wherein, the spring is a sheet spring, which overcomes the problem that movable members is easy to impact the coil and/or impact the housing caused by the spiral spring, which leads to the damage of the housing and the coil, and the noise, however, during the working process of the spring, the above document also has the following disadvantages:

firstly, in practical use, the response speed of the linear vibration motor disclosed by the above document is slow;

secondly, the spring disclosed by the above document has two connection ends, one of them is connected to the lateral wall of the housing, the other one is connected to the lateral wall of the pouring weight, however, since the line between the two connection ends is substantially parallel to the bottom surface/upper cover of the housing, in order to make sure the spring can be compressed and stretched along the vibration direction of the pouring weight, thus ensuring the linear vibration effect, the slot of the spring is designed to be vertical to the vibration direction of the housing, which leads to a narrow installation space inside the housing and along the length direction of the housing, and if the above installation space is increased, the size in length direction of the housing is increased, thus the processing cost is improved and the size of the motor is increased, which is not in favor of the miniaturization of the motor and the compact structure thereof.

SUMMARY OF THE INVENTION

Therefore, the technical problem solved by the present invention is to overcome the shortcomings of slow response speed of the linear vibration motor in the prior art, thus, providing a fast-response horizontal vibration micro motor.

Another technical problem solved by the present invention is to overcome the shortcoming of instability of linear vibration due to unreasonable arrangement of spring, easy to produce noise and large size of housing in the length direction of linear vibration motor in the prior art, thus, provide a fast-response horizontal vibration micro motor, which ensures the stability of linear vibration, reduce the noise and has a compact structure.

Thus, the present invention provides a fast-response horizontal vibration micro motor, comprising a housing, a cover plate for forming an installation space with the housing, provided on the housing, elastic supporting members provided on two opposite walls of the housing, a vibration assembly suspended in the installation space through positioning of the elastic supporting members, and a coil located above a certain distance from the vibration assembly, the vibration assembly is operable to perform reciprocating vibration in a direction substantially parallel to a bottom surface of the housing under the action of magnetic field force, and the two elastic supporting members provided on two opposite walls are operable to be extruded and be compressed during the vibration, the vibration assembly comprises a vibration block provided with at least three installation through holes and permanent magnets installed in the installation through holes.

Two coils are in series connection with each other.

The elastic supporting member comprises a first connecting part, fixed on one end of the vibration block, the end is on a side parallel to the reciprocating vibration direction, a second connecting part, fixed on one side of the housing, which is parallel to the reciprocating vibration direction, and a central connecting part which forms a slot by connecting the first connecting part and the second connecting part.

The slot extends substantially parallel to the reciprocating vibration direction, and the slot is adapted for holding and installing an end of said vibration block extending along the reciprocating vibration direction.

The first connecting part is in transition connection with the central connecting part through a first transition arc in a smooth manner, the second connecting part is in transition connection with the central connecting part through a second transition arc in a smooth manner, the radian of the first transition arc is less than that of the second transition arc.

A rubber block is provided on an opposite plane of a connection plane between the first connecting part and the vibration block and/or an opposite plane of a connection plane between the second connecting part and housing.

A U-shaped locating slot is provided on the rubber block.

A locating block for preventing the vibration block from impacting the housing directly is provided in the installation space, and the locating block is in fixed connection with the bottom surface of the housing.

Two locating block are respectively located at both sides of the bottom surface of the housing.

The locating block is a rectangular block.

A L-shaped stop block is fixed on the cover plate and provided in the installation space, the L-shaped stop block comprises a vertical part and a horizontal part, the height of the vertical part is longer than the vertical distance between the surfaces of the vibration block and the coil, which are close to each other.

A rubber block is assembled on the vertical part.

A Flexible Printed Circuit Board plate is assembled on one side of the installation space, which is close to the cover plate, and one end of the Flexible Printed Circuit Board plate is arranged to extend outside the installation space.

A magnet conducting plate is assembled on one side of the installation space, which is close to the bottom surface of the housing.

The fast-response horizontal vibration micro motor has the following advantages:

1. In the fast-response horizontal vibration micro motor of the present invention, the vibration assembly comprising a vibration block, and the vibration block is provided with at least three installation through holes and permanent magnets installed in the installation through holes. The arrangement of the three permanent magnets may increase the response speed of the motor.

2. In the fast-response horizontal vibration micro motor of the present invention, there are two coils provided in series connection with each other. The arrangement of the two serially-connected coils may coordinate with three permanent magnets and may further increase the response speed of the motor.

3. In the fast-response horizontal vibration micro motor of the present invention, the elastic supporting member comprises a first connecting part, fixed on one end of the vibration block, the end is on a side parallel to the reciprocating vibration direction, a second connecting part, fixed on one side of the housing, which is parallel to the reciprocating vibration direction, and a central connecting part which forms a slot by connecting the first connecting part and the second connecting part. Since the end of the vibration block which is arranged along the reciprocating vibration direction is received and installed in the slot, the inner space of the housing occupied by the vibration block and the elastic supporting member is smaller, thus, the size of the whole vibration motor is reduced, and since the slot is formed on the first connecting part, the second connecting part and the third connecting part, during the vibration process of the vibration block, the elastic supporting member will not be easy to vibrate along the thickness direction of the motor, which makes the vibration reliable, and reduces the noise.

4. In the fast-response horizontal vibration micro motor of the present invention, the first connecting part and the second connecting part are in transition connection with the central connecting part through a first transition arc in a smooth manner, which makes the elastic supporting member more flexible in elastic deformation and more reliable and durable, when the elastic supporting member is driven by the vibration block.

5. The fast-response horizontal vibration micro motor of the present invention, further comprising a rubber block provided on the first connecting part and/or the second connecting part, the first connecting part or the second connecting part is provided between the rubber block and the vibration block. The rubber block is able to strengthen the connection position between the first connecting part and/or the second connecting part and the vibration block and the lateral wall of housing, and the reciprocating vibration frequency of the vibration block can be adjusted by adjusting the size of the rubber block.

6. In the fast-response horizontal vibration micro motor of the present invention, a locating block for preventing the vibration block from impacting the housing directly is provided in the installation space, the setting of the above locating block avoid the direct impact on the bottom surface of the housing by the vibration block of the motor; and the locating block is in fixed connection with the bottom surface of the housing; two locating block are respectively located at both sides of the bottom surface of the housing; and the locating block is a rectangular block.

7. In the fast-response horizontal vibration micro motor of the present invention, a L-shaped stop block is fixed on the cover plate and provided in the installation space, the L-shaped stop block comprises a vertical part and a horizontal part, the height of the vertical part is longer than the vertical distance between the surfaces of the vibration block and the coil, which are close to each other. This arrangement ensures that during the working process of the motor, the vibration block will not impact the coil, which increases the lifetime of the coil.

8. In the fast-response horizontal vibration micro motor of the present invention, a rubber block is assembled on the vertical part. During the working process of the motor, the vibration block vibrates reciprocally along the horizontal direction, since the rubber block is provided on the vertical part of the L-shaped stop block, when the vibration amplitude of the motor is relatively large, the rubber block can buffer the vibration of vibration block, reduce the noise of the motor, and meanwhile, avoid the impact on the lateral wall of the housing by the vibration block.

9. In the fast-response horizontal vibration micro motor of the present invention, a locating slot is provided on an opposite plane of a connection plane between the first connecting part and the vibration block, the locating slot is a U-shaped slot, the arrangement of the above locating slot is convenient for fast-connect of the spring and the vibration block.

Wherein,

1—housing, 2—cover plate, 3—elastic supporting member, 31—first connecting part, 32—second connecting part, 33—central connecting part, 30—slot, 31a—first transition arc, 31b—locating slot, 32a—second transition arc, 4—vibration assembly, 41—vibration block, 42—installation through hole, 43—permanent magnet 44—concave table, 5—coil, 6—rubber block, 7—locating slot, 8—L—shaped stop block, 81—vertical part, 82—horizontal part, 9—rubber block, 10—FPCB plate, 11—magnet conducting plate.

DETAILED DESCRIPTION OF THE PREFERRED EMBODIMENTS

The fast-response horizontal vibration micro motor of the present invention will be described in greater detail with references to the appended drawings 1-6.

Embodiment

Figure 1:
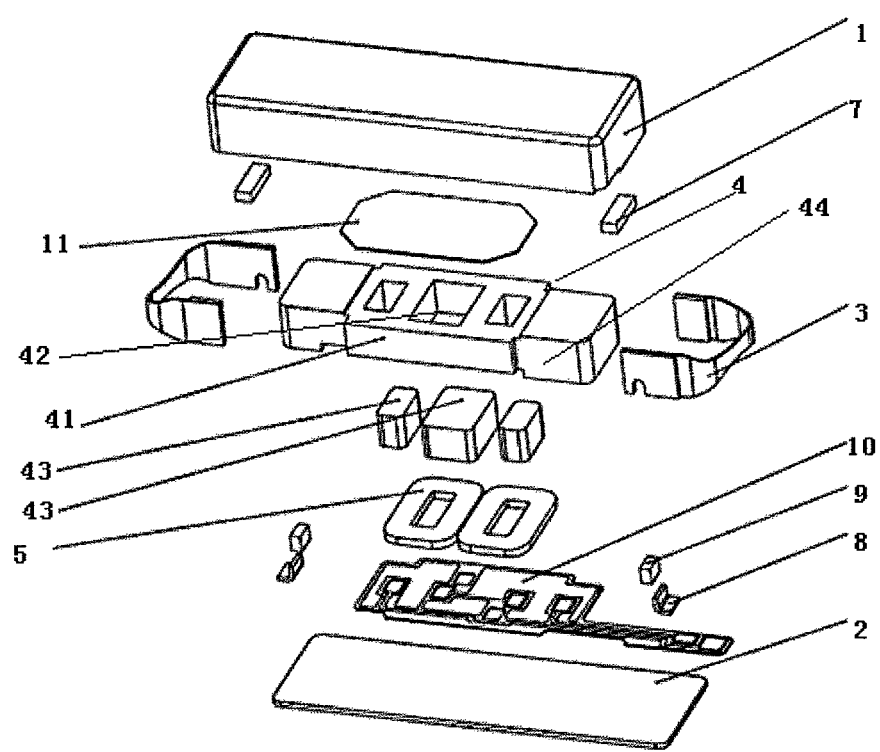
FIG. 1 is a decomposition schematic view of the whole structure of the horizontal vibration micro motor of embodiment 1.
Figure 4:
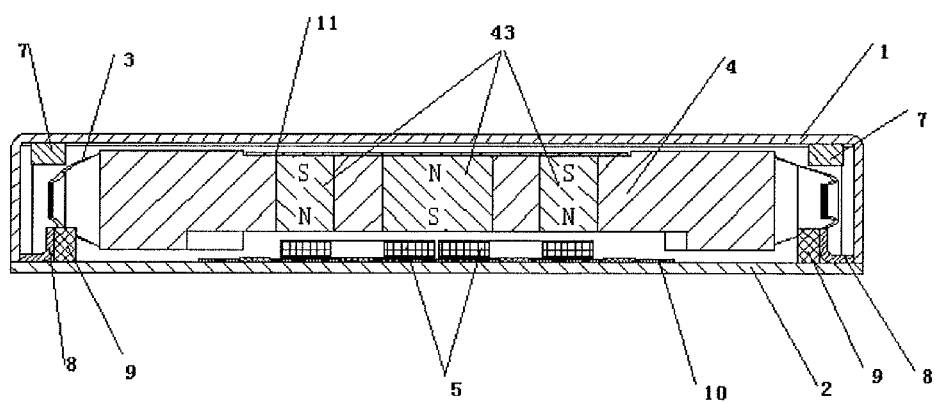
FIG. 4 is a longitudinal section view of the horizontal vibration micro motor of embodiment 1.
Figure 5:
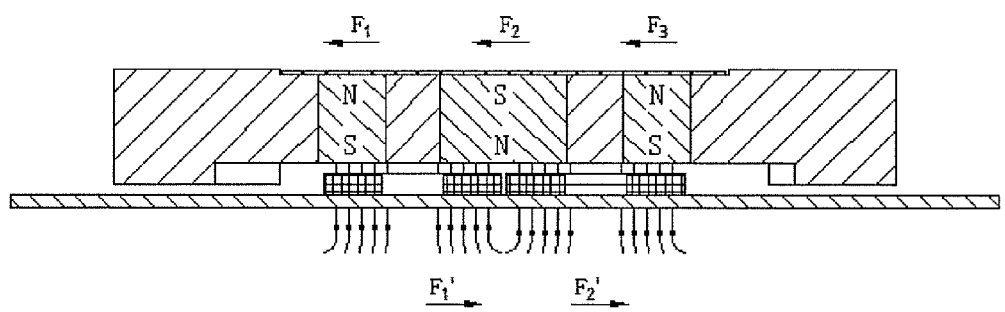
FIG. 5 is a stress view of the horizontal vibration micro motor shown in FIG. 4.

The present invention provides a horizontal vibration micro motor, as shown in FIG. 1 and FIG. 4, a housing 1, a cover plate 2 for forming an installation space with the housing 1, provided on the housing 1, elastic supporting members 3 provided on two opposite walls of the housing 1, a vibration assembly suspended in the installation space through positioning of the elastic supporting members 3, and a coil 5 located at a certain distance from a surface of the vibration assembly, the vibration assembly 4 is operable to perform reciprocating vibration in a direction (see "A" in FIG. 2) substantially parallel to a bottom surface of the housing 1 under the action of magnetic field force, and the two elastic supporting members 3 provided on two opposite walls are operable to be extruded and be compressed during the vibration, in the present embodiment, the vibration assembly 4 comprises a vibration block 41 provided with at least three installation through holes 42 and permanent magnets 43 installed in the installation through holes. Meanwhile, there are two coils 5, which are in series connection with each other.

The response speed of the motor is increased by providing three permanent magnets 43 and two coils in series connection with each other, which makes the motor more flexible.

In the present embodiment, in order to reduce the friction between the upper surface of the vibration block 41 and the coil 5, a magnetic lubrication gap is provided therebetween.

Figure 6:
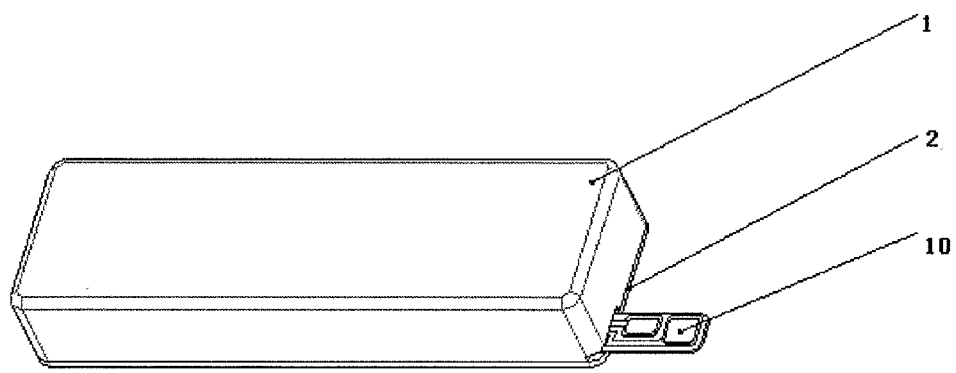
FIG. 6 is an appearance schematic view of horizontal vibration micro motor of embodiment 1.

In the present embodiment, as shown in FIG. 6, a Flexible Printed Circuit Board plate 10 is assembled on one side of the installation space, which is close to the cover plate 2, and one end of the Flexible Printed Circuit Board plate 10 is arranged to extend outside the installation space.

In the present embodiment, a magnet conducting plate 11 is assembled on one side of the installation space, which is close to the bottom surface of the housing 1. The lines of magnetic force pass through the magnet conducting plate 11 and return directly by increasing the number of the magnet conducting plate 11, thus form a loop, without allowing the lines of magnetic force to pass through the bottom surface of housing 1, which is in favor of improving the magnetic field strength.

Figure 2:
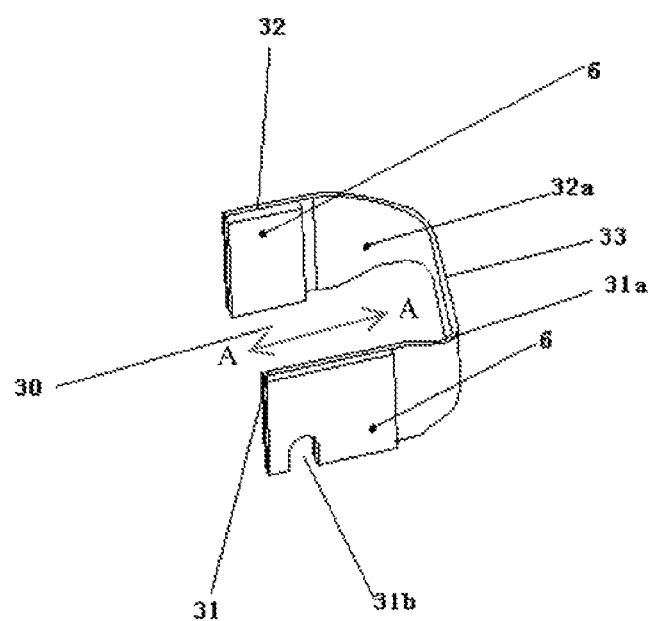
FIG. 2 is a schematic view of the structure of the elastic supporting member of embodiment 1.
Figure 3:
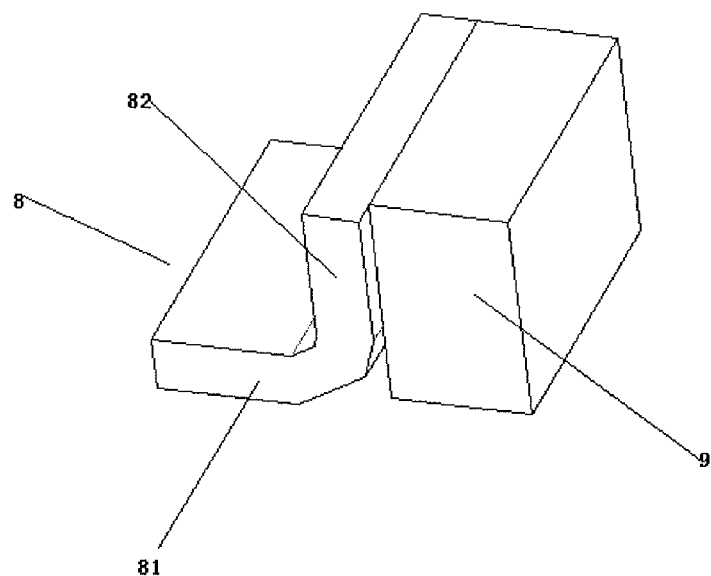
FIG. 3 is a schematic view of the connection structure of the L-shaped stop block and the rubber block.

In the present embodiment, as shown in FIG. 2, the elastic supporting member 3 comprises a first connecting part 31, fixed on one end of the vibration block 41 and with the end arranged on a side parallel to the reciprocating vibration direction, a second connecting part 32, fixed on one side of the housing 1 and with the side parallel to the reciprocating vibration direction, and a central connecting part 33 which forms a slot 30 by connecting the first connecting part 31 and the second connecting part 32, the slot 30 extends substantially parallel to the reciprocating vibration direction, and the slot 30 is adapted for holding and installing an end of the vibration block 41 extending along the reciprocating vibration direction. The first connecting part 31 is in transition connection with the central connecting part 33 through a first transition arc 31a in a smooth manner, the second connecting part 32 is in transition connection with the central connecting part 33 through a second transition arc 32a in a smooth manner, the curvature radius of the first transition arc 31a is less than that of the second transition arc 32a, and the length of the second connecting part 32 is larger than that of the first connecting part 31, the central connecting part 33 is in flat type, and the whole elastic supporting member 3 is made of stainless steel.

The connection mode between the above first connecting part 31 and the vibration block 41 and that between the second connecting part 32 and the housing 1 are both in the form of laser beam welding.

As an improvement of the present embodiment, a rubber block 6 is provided on an opposite plane of a connection plane between the first connecting part 31 and the vibration block 41 and an opposite plane of a connection plane between the second connecting part 32 and housing 1. The rubber block 6 is able to strengthen the connection position of laser beam welding between the first connecting part 31 and/or the second connecting part 32 and the vibration block 41 and the lateral wall of housing 1, and the reciprocating vibration frequency of the vibration block 41 can be adjusted by adjusting the size of the rubber block 6.

As another improvement of the present embodiment, a U-shaped locating slot 31b is provided on the rubber block 6, and the locating slot 31b is provided for fixing the elastic supporting member 3 and the vibration block 41.

As a further improvement of the present embodiment, a concave table 44 for receiving the first connecting part 31 and/or the second connecting part 32 is provided on the vibration block 41, which further saves the internal space, reserves space for the deformation of the elastic supporting member 3, and makes the structure compact.

In the present embodiment, a locating block 7 for preventing the vibration block 41 from impacting the housing 1 directly is provided in the installation space, and the locating block 7 is in fixed connection with the bottom surface of the housing 1; two locating block 7 are respectively located at both sides of the bottom surface of the housing 1; the locating block 7 is a rectangular block, and the locating block is made of stainless steel.

In the present embodiment, as shown in FIG. 1, 3, 4, a L-shaped stop block 8 is fixed on the cover plate 2 and provided in the installation space, the L-shaped stop block 8 comprises a vertical part 81 and a horizontal part 82, the height of the vertical part 81 is longer than the vertical distance between the surface of the vibration block 41 and the coil 5, which close to each other, a rubber block 9 is assembled on the vertical part 81.

The fast-response horizontal vibration micro motor of the present embodiment, the height of the vertical part 81 is longer than the vertical distance between the surface of the vibration block 41 and the coil 5, this kind of arrangement ensure that, during the working process of the motor, the vibration block 41 will not impact the coil 5, which increases the lifetime of the coil 5. Meanwhile, during the working process of the motor, the vibration block 41 vibrates reciprocally along the horizontal direction, since the rubber block 9 is provided on the vertical part 81 of the L-shaped stop block, when the vibration amplitude of the motor is relatively large, the rubber block 9 can buffer the vibration of vibration block 41, reduce the noise of the motor, and meanwhile, avoid the impact on the lateral wall of the housing 1 by the vibration block 41.

Obviously, the above mentioned embodiments are for clearly explaining the present invention, which do not constitute undue limitation of the present invention. It is obviously to the skilled person in the art that, various modifications could be derived without departing from the spirits and the effects of the invention. And there is no need to describe all the embodiments Therefore, the modifications or alternations derived thereof are still included in the protection scope of the present invention.

The invention claimed is:

1. A fast-response horizontal vibration micro motor, comprising
    a housing;
    a cover plate, wherein said housing is provided on the cover plate and forms an installation space with the cover plate;
    elastic supporting members provided on two opposite walls of said housing;
    a vibration assembly suspended in said installation space through positioning of said elastic supporting members; and
    a coil located at a certain distance from a surface of said vibration assembly,
    wherein:

said vibration assembly is operable to perform reciprocating vibration in a direction substantially parallel to a bottom surface of said housing under the action of magnetic field force, and the two elastic supporting members provided on two opposite walls are operable to be extruded and be compressed during the vibration;

said vibration assembly comprises a vibration block, provided with at least three installation through holes, and permanent magnets installed in the installation through holes;

said elastic supporting member comprises
- a first connecting part, fixed on one end of said vibration block, said end is on a side parallel to said reciprocating vibration direction;
- a second connecting part, fixed on one side of said housing, which is parallel to said reciprocating vibration direction; and
- a central connecting part which forms a slot by connecting said first connecting part and said second connecting part;

said slot extends substantially parallel to said reciprocating vibration direction, and said slot is adapted for holding and installing an end of said vibration block extending along said reciprocating vibration direction; and a rubber block is provided on an opposite plane of a connection plane between said first connecting part and said vibration block and/or an opposite plane of a connection plane between said second connecting part and housing.

2. The fast-response horizontal vibration micro motor of claim 1, wherein,
a first locating block for preventing said vibration block from impacting said housing directly is provided in said installation space, and said first locating block is in fixed connection with the bottom surface of said housing.

3. The fast-response horizontal vibration micro motor of claim 2, further comprising a second locating block in fixed connection with the bottom surface of said housing,
said first and second locating blocks being each located at a respective one of two sides of the bottom surface of said housing.

4. The fast-response horizontal vibration micro motor of claim 2, wherein,
said first locating block is a rectangular block.

5. The fast-response horizontal vibration micro motor of claim 1, wherein,
a L-shaped stop block is fixed on said cover plate and provided in said installation space;
said L-shaped stop block comprises
a vertical part; and
a horizontal part; and
the height of said vertical part is longer than the vertical distance between the surfaces of said vibration block and said coil, which are close to each other.

6. The fast-response horizontal vibration micro motor of claim 5, wherein,
a rubber block is assembled on said vertical part.

7. A fast-response horizontal vibration micro motor, comprising
a housing;
a cover plate, wherein said housing is provided on the cover plate and forms an installation space with the cover plate;
elastic supporting members provided on two opposite walls of said housing;
a vibration assembly suspended in said installation space through positioning of said elastic supporting members; and
a coil located at a certain distance from a surface of said vibration assembly,
wherein:
said vibration assembly is operable to perform reciprocating vibration in a direction substantially parallel to a bottom surface of said housing under the action of magnetic field force, and the two elastic supporting members provided on two opposite walls are operable to be extruded and be compressed during the vibration;
said vibration assembly comprises a vibration block, provided with at least three installation through holes, and permanent magnets installed in the installation through holes;
said elastic supporting member comprises
- a first connecting part, fixed on one end of said vibration block, said end is on a side parallel to said reciprocating vibration direction;
- a second connecting part, fixed on one side of said housing, which is parallel to said reciprocating vibration direction; and
- a central connecting part which forms a slot by connecting said first connecting part and said second connecting part;

said slot extends substantially parallel to said reciprocating vibration direction, and said slot is adapted for holding and installing an end of said vibration block extending along said reciprocating vibration direction; and a first locating block for preventing said vibration block from impacting said housing directly is provided in said installation space, and said first locating block is in fixed connection with the bottom surface of said housing.

8. The fast-response horizontal vibration micro motor of claim 7, further comprising a second locating block in fixed connection with the bottom surface of said housing,
said first and second locating blocks being each located at a respective one of two sides of the bottom surface of said housing.

9. The fast-response horizontal vibration micro motor of claim 7, wherein said first locating block is a rectangular block.

10. A fast-response horizontal vibration micro motor, comprising
a housing;
a cover plate, wherein said housing is provided on the cover plate and forms an installation space with the cover plate;
elastic supporting members provided on two opposite walls of said housing;
a vibration assembly suspended in said installation space through positioning of said elastic supporting members; and
a coil located at a certain distance from a surface of said vibration assembly,
wherein:
said vibration assembly is operable to perform reciprocating vibration in a direction substantially parallel to a bottom surface of said housing under the action of magnetic field force, and the two elastic supporting members provided on two opposite walls are operable to be extruded and be compressed during the vibration;
said vibration assembly comprises a vibration block, provided with at least three installation through holes, and permanent magnets installed in the installation through holes;

said elastic supporting member comprises
- a first connecting part, fixed on one end of said vibration block, said end is on a side parallel to said reciprocating vibration direction;
- a second connecting part, fixed on one side of said housing, which is parallel to said reciprocating vibration direction; and
- a central connecting part which forms a slot by connecting said first connecting part and said second connecting part;

said slot extends substantially parallel to said reciprocating vibration direction, and said slot is adapted for holding and installing an end of said vibration block extending along said reciprocating vibration direction;

a L-shaped stop block is fixed on said cover plate and provided in said installation space;

said L-shaped stop block comprises
- a vertical part; and
- a horizontal part; and the height of said vertical part is longer than the vertical distance between the surfaces of said vibration block and said coil, which are close to each other.

11. The fast-response horizontal vibration micro motor of claim 10, wherein a rubber block is assembled on said vertical part.

* * * * *